(12) United States Patent
Potkonjak

(10) Patent No.: US 8,902,797 B2
(45) Date of Patent: Dec. 2, 2014

(54) APPROACH FOR OPTIMIZING ENERGY CONSUMPTION OF MULTIPLE-INPUT MULTIPLE-OUTPUT SYSTEM

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 932 days.

(21) Appl. No.: 12/538,879

(22) Filed: Aug. 11, 2009

(65) Prior Publication Data

US 2011/0038432 A1 Feb. 17, 2011

(51) Int. Cl.
*H04B 7/00* (2006.01)
*H04W 4/00* (2009.01)
*H04M 1/00* (2006.01)
*H04B 7/24* (2006.01)
*H04B 1/16* (2006.01)
*G06F 15/16* (2006.01)
*H04W 52/28* (2009.01)
*H04B 7/04* (2006.01)
*H04W 52/42* (2009.01)

(52) U.S. Cl.
CPC ............ *H04W 52/28* (2013.01); *H04B 7/0413* (2013.01); *Y02B 60/50* (2013.01); *H04W 52/42* (2013.01)
USPC ........... 370/310; 370/329; 370/341; 455/574; 455/39; 455/343.2; 375/140; 709/235

(58) Field of Classification Search
CPC ..................................................... H04W 84/18
USPC ............... 370/310, 341, 329, 318; 455/343.2; 177/211; 709/235; 340/539.12; 375/140
See application file for complete search history.

(56) References Cited

U.S. PATENT DOCUMENTS

| 4,909,340 | A | * | 3/1990 | Kazais et al. ................. 177/211 |
| 5,345,599 | A | | 9/1994 | Paulraj et al. |
| 6,934,317 | B1 | * | 8/2005 | Dent ............................. 375/140 |

(Continued)

FOREIGN PATENT DOCUMENTS

JP 2009147720 A 7/2009

OTHER PUBLICATIONS

Rui Zhang, Chin Choy Chai and Ying Chang Liang, Joint Beamforming and Power Control for MIMO Relay Broadcast Channel with QoS Constraints, IEEE, 2007, pp. 453-457.

(Continued)

*Primary Examiner* — Ian Moore
*Assistant Examiner* — Kiet Tang
(74) *Attorney, Agent, or Firm* — Ren-Sheng International

(57) ABSTRACT

The present disclosure generally relates to techniques to reduce energy consumption in a multiple-input multiple-output (MIMO) system. Some example embodiments may include collecting a set of information associated with one or more of an energy consumption, a network traffic condition, an environmental condition, and/or quality of a communication link associated with the first wireless communication device and/or the MIMO system, configuring the first wireless communication device to operate at a first reduced energy consumption level based on the collected set of information, identifying operation information associated with the first wireless communication device based upon at least the configuration of the first wireless communication device, and transmitting the operation information for reception by the second wireless communication device so that the second wireless communication device can be configured to operate at a second reduced energy consumption level based on the operation information.

18 Claims, 8 Drawing Sheets

(56) References Cited

U.S. PATENT DOCUMENTS

| | | | |
|---|---|---|---|
| 8,139,516 | B2 | 3/2012 | Isozu et al. |
| 2006/0220839 | A1* | 10/2006 | Fifolt et al. ............... 340/539.12 |
| 2007/0037610 | A1* | 2/2007 | Logan ........................... 455/574 |
| 2007/0264963 | A1* | 11/2007 | Srinivasan et al. .......... 455/343.2 |
| 2008/0025279 | A1* | 1/2008 | Young et al. .................. 370/341 |
| 2009/0092201 | A1 | 4/2009 | Luo et al. |
| 2009/0113069 | A1* | 4/2009 | Prabhakar et al. ............ 709/235 |
| 2009/0207792 | A1* | 8/2009 | Isozu et al. ................... 370/329 |
| 2010/0004017 | A1 | 1/2010 | Kikuchi |
| 2011/0244792 | A1* | 10/2011 | Park et al. ....................... 455/39 |

OTHER PUBLICATIONS

Chalise, B.K. and Czylwik, A., Optimum Power Control for a Multi-User MIMO System with Beamforming, IEEE, 2005, pp. 1-5.

Notification of Transmittal of the International Search Report and the Written Opinion of the International Searching Authority, Sep. 7, 2010.

Anantha P. Chandrakasan, Miodrag Potkonjak, Renu Mehha, Jan Rabaey and Robert W. Brodersen, Optimizing Power Using Transformations, p. 1-27.

Inki Hong, Darko Kirovski, Gang Qu, Miodrag Potkonjak and Mani B. Srivastava, Power Optimization of Variable-Voltage Core-Based Systems, IEEE Transactions on Computer-Aided Design of Integrated Circuits and Systems, Dec. 1999, p. 1702-1714, vol. 18, No. 12.

Alberto Cerpa, Jennifer L. Wong, Miodrag Potkonjak and Deborah Estrin, Temporal Properties of Low Power Wireless Links: Modeling and Implications on Multi-Hop Routing, Jan. 2005, p. 1-13.

G.J. Foschini and M.J. Gans, On Limits of Wireless Communications in a Fading Environment when Using Multiple Antennas, Wireless Personal Communications, 1998, 6: 311-335.

Gerard J. Foschini, Layered Space-Time Architecture for Wireless Communication in a Fading Environment When Using Multi-Element Antennas, Autumn 1996, p. 41-59 (http://users.ece.utexas.edu/~rheath/courses/mimo/suggested_readings/ref/11-1.pdf).

Jason Flinn and M. Satyanarayanan, Energy-aware adaptation for mobile applications, 17th ACM Symposium on Operating Systems Principles, Dec. 1999, Published as Operating Systems Review, 34(5):48-63.

Jacob R. Lorch and Alan Jay Smith, Improving Dynamic Voltage Scaling Algorithms with PACE, Jun. 1, 2001.

Trevor Pering, Tom Burd and Robert Brodersen, The Simulation and Evaluation of Dynamic Voltage Scaling Algorithms, ISLPED 98, Aug. 10-12, 1998, Monterey, CA USA, p. 76-81.

Padmanabhan Pillai and Kang G. Shin, Real-Time Dynamic Voltage Scaling for Low-Power Embedded Operating Systems, 2001 ACM ISBN 1-58113-389-8-1/01/10, p. 89-102.

I. Emre Telatar, Capacity of Multi-antenna Gaussian Channels, Lucent Technologies, Bell Laboratories, p. 1-28.

Gregory G. Raleigh and John M. Cioffi, Spatio-Temporal Coding for Wireless Communication, IEEE Transactions on Communications, Mar. 1998, p. 357-366, vol. 46, No. 3.

Arogyaswami J. Paulraj and Constantinos B. Papadias, Space-Time Processing for Wireless Communications, IEEE 1997, p. 49-83.

Jack H. Winters, On the Capacity of Radio Communication Systems with Diversity in a, Rayleigh Fading Environment, IEEE Journal on Selected Areas in Communications, Jun. 1987, p. 871-878, vol. SAC-5, No. 5.

Gerard J. Foschini, Dmitry Chizhik, Michael J. Gans, Constantinos Papadias and Reinaldo A. Valenzuela, Analysis and Performance of Some Basic Space-Time Architectures, IEEE Journal on Selected Areas in Communications, Apr. 2003, p. 303-320, vol. 21, No. 3.

Chandrakasan, A.P, et al., "Optimizing Power Using Transformations," IEEE Transactions on Computer-Aided Design of Integrated Circuits and Systems, vol. 14, No. 1, pp. 12-31, IEEE (1995).

* cited by examiner

800 A computer program product

804 A signal bearing medium 802 at least one of one or more instructions for collecting a set of information associated with one or more of an energy consumption, a network traffic condition, an environmental condition, and/or quality of a communication link associated with the first wireless communication device and/or the MIMO system;

one or more instructions for configuring the first wireless communication device to operate at a first reduced energy consumption level based on the collected set of information;

one or more instructions for identifying operation information associated with the first wireless communication device based upon at least the configuration of the first wireless communication device; or one or more instructions for transmitting the operation information for reception by the second wireless communication device so that the second wireless communication device can be configured to operate at a second reduced energy consumption level based on the operation information.

| 808 a computer readable medium | 812 a recordable medium | 806 a communications medium |

Fig. 8

APPROACH FOR OPTIMIZING ENERGY CONSUMPTION OF MULTIPLE-INPUT MULTIPLE-OUTPUT SYSTEM

BACKGROUND

Unless otherwise indicated herein, the approaches described in this section are not prior art to the claims in this application and are not admitted to be prior art by inclusion in this section.

A multiple-input multiple-output (MIMO) system utilizes multiple antennas at both transmitters and receivers to offer significant increase in data throughput and link range without additional bandwidth or transmit power. Although various techniques have been introduced to operate the MIMO system at low energy consumption modes, these techniques generally consider a limited number of factors for a single MIMO device within the system and assume many aspects of the entire system to be fixed.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are therefore not to be considered limiting of its scope. The disclosure will be described with additional specificity and detail through use of the accompanying drawings.

In the drawings:

FIG. 8 is a schematic diagram showing an example computer program product, all arranged in accordance with at least some embodiments of the present disclosure.

DETAILED DESCRIPTION

Figure 1:
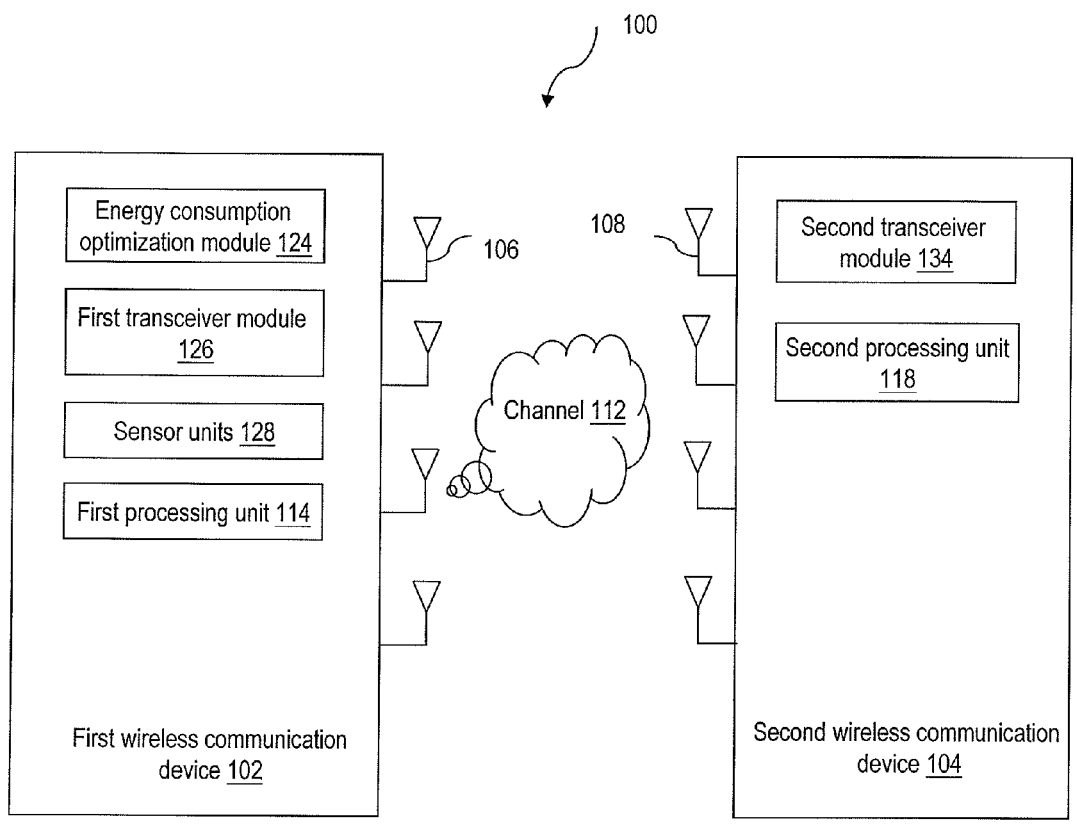
FIG. 1 is a block diagram showing an example wireless communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a block diagram showing an example wireless communication system 100 arranged in accordance with at least some embodiments of the present disclosure. The wireless communication system 100 includes a first wireless communication device 102 and a second wireless communication device 104. The first wireless communication device 102 includes one or more antennas 106 for transmitting and receiving information, while the second wireless communication device 104 also includes one or more antennas 108. When the first wireless communication device 102 communicates with the second wireless communication device 104, one or more channels 112 may be established between the first wireless communication device 102 and the second wireless communication device 104. The first wireless communication device 102 may further comprise one or more of a first processing unit 114, an energy consumption optimization module 124, a first transceiver module 126, and/or sensor units 128. The second wireless communication device 104 may include a second processing unit 118 and/or a second transceiver module 134. Though not shown in FIG. 1, the second wireless communication device 104 may also include an energy consumption optimization module. In some implementations, the wireless communication system 100 may be a multiple-input multiple-output (MIMO) system.

The energy consumption optimization module 124 may be configured to follow certain energy saving principles to approximately optimize energy usage for the wireless communication system 100. A variety of processes may be employed to illustrate example energy saving principals. An example process that may be employed by module 124 may be configured to identify as many components within the wireless communication system 100 that may be configured to operate in a low energy consumption mode. Another example process may be arranged to reduce the amount of time the identified components spend in a high energy consumption mode. Yet another example process may be to reduce the energy required for a specific mode of operation.

To illustrate the aforementioned energy saving principles, in some implementations, the energy consumption optimization module 124 may be adapted to identify the first transceiver module 126 that may operate in one or more low energy operating modes, such as, without limitation, a listening mode and/or a sleeping mode. These operating modes may consume less energy than energy intensive modes, for example, a transmitting mode or a receiving mode.

Continuing with the first transceiver module 126 example, the energy consumption optimization module 124 may also be arranged to configure the first transceiver module 126 to remain in the listening mode or the sleeping mode for as long as certain conditions (e.g., high data congestion) may be present. The first transceiver module 126 may also be configured to utilize high data rate links and/or data compression techniques. In other words, by reducing the amount of time that the identified components, such as the first transceiver module 126, spend in a high energy consumption mode, the overall energy consumption for the wireless communication system 100 may be significantly reduced.

Moreover, in some implementations, the energy consumption optimization module 124 may be adapted to detect factors (e.g., temperature) that may allow the first wireless communication device 102 or even the wireless communication system 100 to operate a certain mode in an energy efficient manner. Although some examples have been discussed above to illustrate the energy saving principles, additional details and examples may be provided in the subsequent paragraphs.

Figure 2:
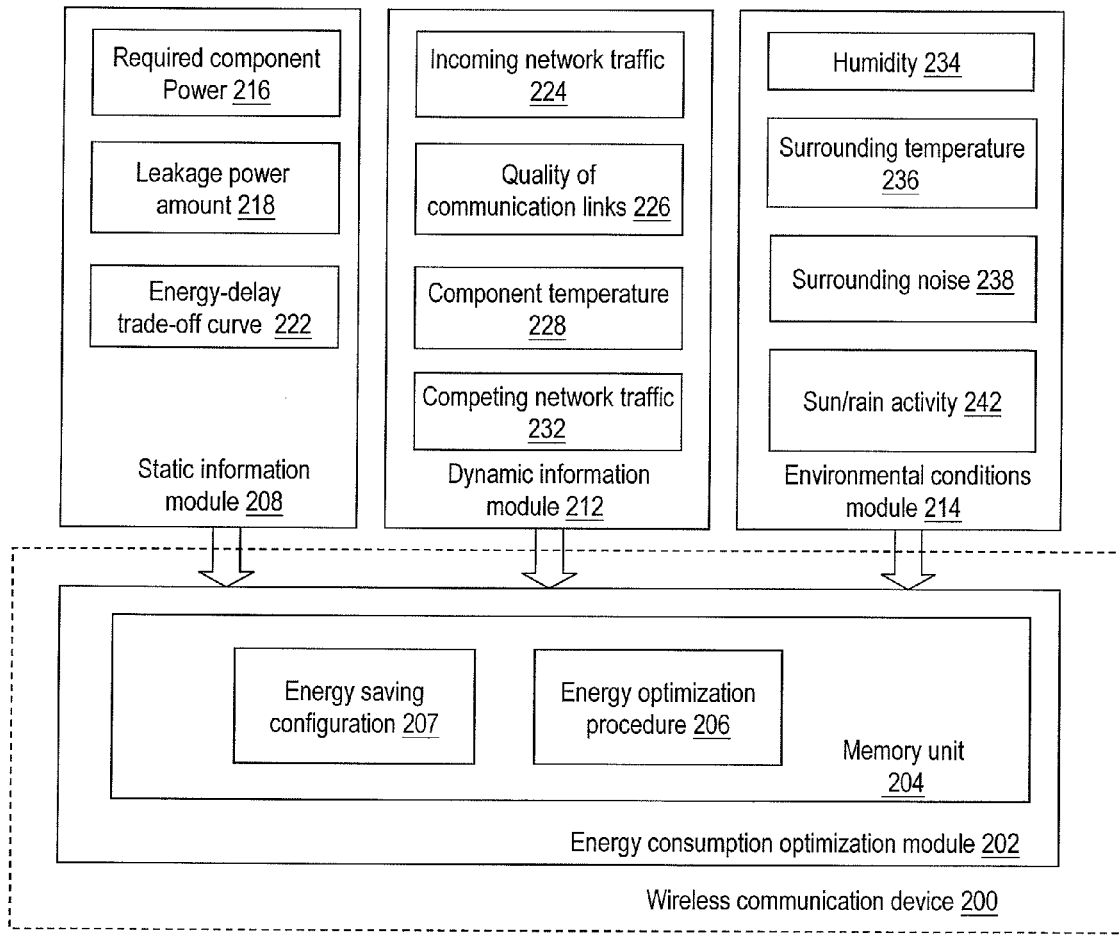
FIG. 2 is a schematic diagram showing an example energy consumption optimization module of a wireless communication device in a wireless communication system.

FIG. 2 is a schematic diagram showing an example energy consumption optimization module 202 of a wireless communication device in a wireless communication device 200 arranged in accordance with at least some embodiments of the present disclosure. The wireless communication device 200 may correspond to the first wireless communication device 102 of FIG. 1. The energy consumption optimization module 202 may comprise a memory unit 204, which may store an energy optimization procedure 206 and/or an energy saving configuration 207. The energy consumption optimization module 202 may be configured to receive and operate on a set of information that may affect energy consumption. Such set of information may be associated with various types of conditions and may be tracked in different modules. Some example modules may include, without limitation, one or more of a static information module 208, a dynamic information module 212, and/or an environmental conditions module 214.

The static information module 208 may be configured to obtain energy consumption information that may not depend on the operational conditions of the first wireless communication device and tends to be predetermined. Such energy consumption information may include, without limitation, one or more of required component power 216 to operate on a specific transmission level, a leakage power amount 218 also associated with the component, and/or an energy-delay trade-off curve 222 for the wireless communication device.

The dynamic information module 212 may be configured to obtain energy consumption information that may depend on the operational conditions of not only the first wireless communication device but, in some examples, may also depend on the operation conditions of the entire wireless communication system. Some example energy consumption information obtained by this module may include, but not limited to, one or more of incoming network traffic 224 to the wireless communication device, quality of communication links 226 in the entire wireless communication system, component temperature 228 also in the entire wireless communication system, and/or competing network traffic 232 for the wireless communication device.

The environmental conditions module 214 may also be configured to obtain dynamically changing information associated with the wireless communication device and/or the wireless communication system. Some example information obtained by this module may include, but not limited to, one or more of humidity 234, surrounding temperature 236, noise 238, and/or sun/rain activity 242. In some implementations of the dynamic information module 212 and the environmental conditions module 214, the sensor units of the wireless communication device (e.g., the sensor units 128 shown in FIG. 1) may be adapted to collect and/or determine the relevant dynamic information about the device itself or the system that the device is in.

In some implementations, the energy saving configuration 207 may include a number of adjustable energy consumption parameters containing values that may yield an energy efficient setup for the wireless communication device. The energy optimization procedure 206 may be arranged to calculate an expected energy consumption level for the wireless communication device based on the information obtained in one or more of the static information module 208, the dynamic information module 212, and/or the environmental conditions module 214. The energy optimization procedure 206 may also be arranged to refer to the energy consumption parameters in the energy saving configuration 207 to determine ways to potentially reduce the expected energy consumption level.

Figure 3:
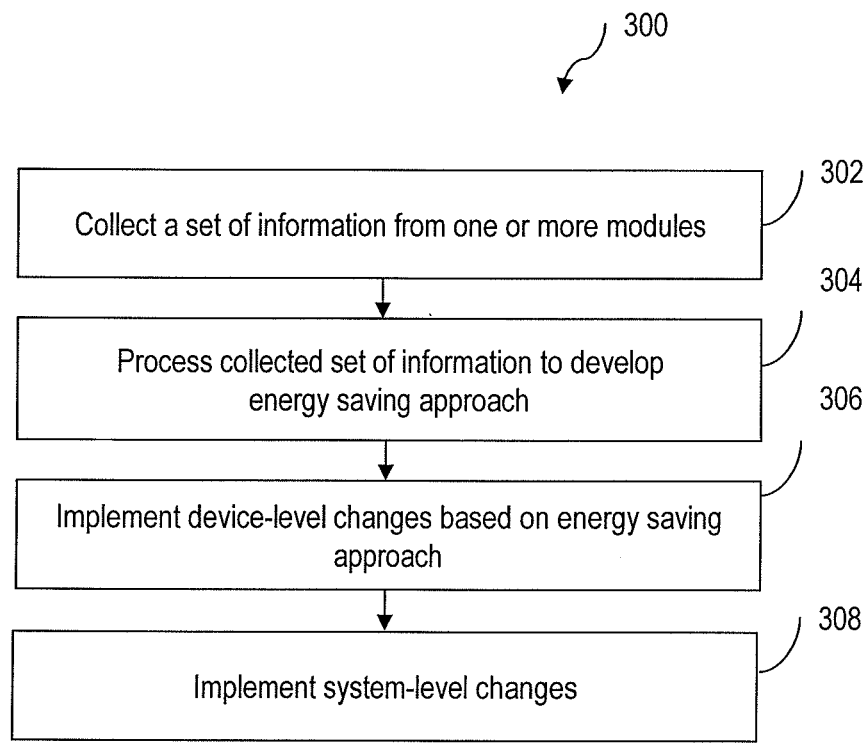
FIG. 3 is a flow chart showing example operations performed by a first wireless communication device in a wireless communication system.

FIG. 3 is a flow chart showing an example process 300 that may be performed by a first wireless communication device in a wireless communication system, arranged in accordance with at least some embodiments of the present disclosure. The example process 300 may include one or more of operations 302-308. An example first wireless communication device may be the first wireless communication device 102 of FIG. 1.

In operation 302, the first wireless communication device may collect a set of information obtained from one or more different types of modules. Operation 302 may be followed by operation 304.

In operation 304, an energy consumption optimization module of the first wireless communication device (e.g., the energy consumption optimization module 202 of FIG. 2) may be adapted to process the collected set of information to develop an energy saving approach. Operation 304 may be followed by operation 306.

In operation 306, the energy consumption optimization module may be adapted to cause device-level changes based on the energy saving approach. Operation 306 may be followed by operation 308.

In operation 308, the energy consumption optimization module may also be adapted to cause system-level changes. In some implementations, the first wireless communication device may be adapted to transmit some of its information to a second wireless communication device in the same wireless communication system, so that the operations of the second wireless communication device may also be changed to reduce energy consumption.

The following paragraphs describe some examples of the operations illustrated in FIG. 3.

Figure 4:
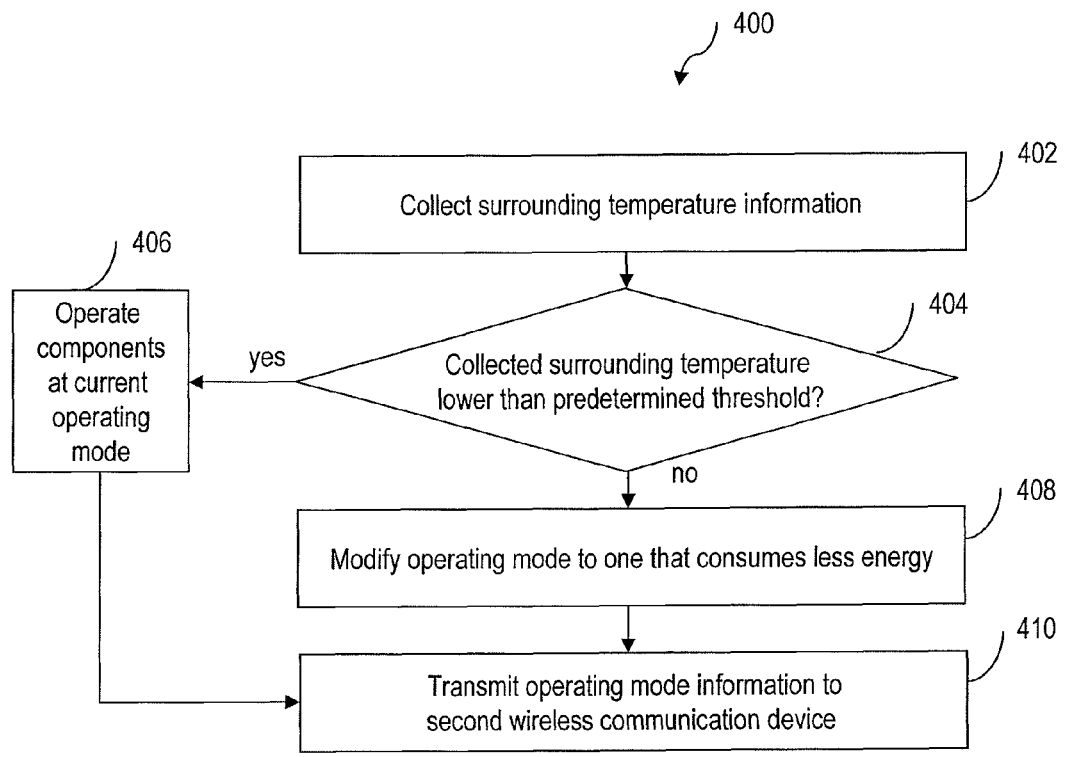
FIG. 4 is a flow chart showing example operations performed by a first wireless communication device in a wireless system in response to its surrounding temperature.

FIG. 4 is a flow chart showing an example process 400 that may be performed by a first wireless communication device in a wireless communication system in response to its surrounding temperature, arranged in accordance with at least some embodiments of the present disclosure. The example process 400 may include one or more of operations 402-410. An example first wireless communication device may be the first wireless communication device 102 of FIG. 1.

In operation 402, the first wireless communication device may be adapted to collect the temperature information surrounding the device itself and/or surrounding the wireless communication system. Operation 402 may be followed by operation 404.

In operation 404, the first wireless communication device may be adapted to determine whether the collected surrounding temperature is lower than a predetermined threshold. In some implementations, the predetermined threshold may correspond to one of the adjustable energy consumption parameters stored in an energy saving configuration accessible by the optimization module of the first wireless communication device. The predetermined threshold may be set to reflect an ambient temperature threshold under which the first wireless communication device could carry out energy intensive tasks in an energy efficient manner. Operation 404 may be followed by operation 406 when the surrounding temperature is lower than the predetermined threshold. Otherwise operation 404 may be followed by operation 408 when the surrounding temperature fails to be lower than the predetermined threshold.

In operation 406, the first wireless communication device may be adapted to continue to operate its components at the current operating mode. Operation 406 may be followed by operation 410.

In operation 408, the first wireless communication device may be adapted to modify the operating mode of one or more of its components to one that consumes less energy. Operation 408 may be followed by operation 410.

In operation 410, the first wireless communication device may also be configured to transmit the relevant operating mode information of its one or more components to a second wireless communication device in the same wireless communication system.

To further illustrate the example operations of FIG. 4, suppose a first transceiver module of the first wireless communication device is initially configured to operate in a transmitting mode. When the collected surrounding temperature remains below the predetermined threshold, the first transceiver module may continue to operate in the transmitting mode, because transmitting in such a temperature condition may be considered to be energy-efficient. The first wireless communication device may also be adapted to transmit the operating mode of the first transceiver module to the second wireless communication device. In response, a second transceiver module of the second wireless communication device may be configured to operate in a receiving mode to receive data from the first wireless communication device.

On the other hand, when the collected surrounding temperature rises above the predetermined threshold, the first transceiver module may be arranged to adapt to operate in a different mode (e.g., a sleeping mode) that may consume less energy than operating in the transmitting mode. The first wireless communication device may also be adapted to transmit this newly modified operating mode to the second wireless communication device. In response, the second transceiver module and possibly one or more additional components involved in handling data reception may be arranged to adapt to operate in the sleeping mode to conserve energy, since no data is expected from the first wireless communication device. As a result, not only may the first wireless communication device end up consuming less energy, but the second wireless communication device may also end up consuming less energy. In other words, the energy consumption level for the overall wireless communication system may be reduced based on the surrounding temperature conditions.

Figure 5:
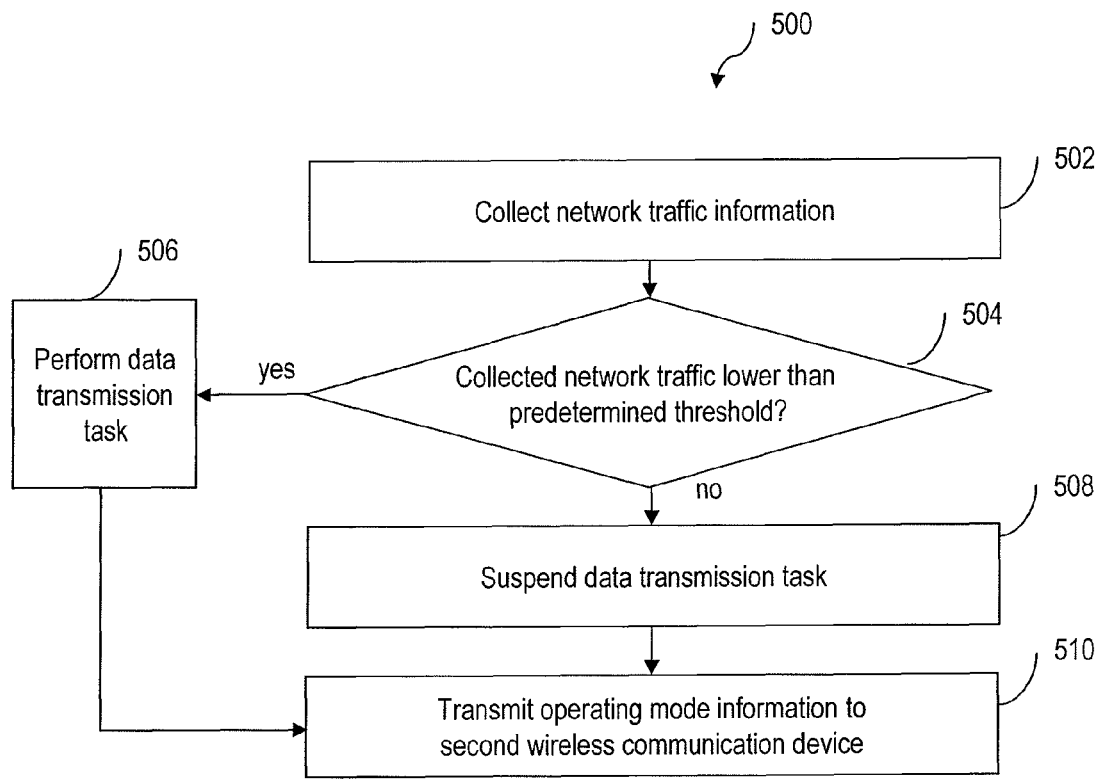
FIG. 5 is a flow chart showing an example operation performed by a first wireless communication device in a wireless communication system in response to its network traffic conditions.

FIG. 5 is a flow chart showing an example process 500 that may be performed by a first wireless communication device in a wireless communication system in response to its network traffic conditions, arranged in accordance with at least some embodiments of the present disclosure. The example process 500 may include one or more of operations 502-510. An example first wireless communication device may be the first wireless communication device 102 of FIG. 1.

In operation 502, the first wireless communication device may be adapted to collect network traffic information. Operation 502 may be followed by operation 504.

In operation 504, the first wireless communication device may be adapted to determine whether the collected network traffic information is lower than a predetermined threshold. In some implementations, the predetermined threshold may be set to reflect a certain level of network congestion. When the collected network traffic of the first wireless communication device is below than the threshold, the first wireless communication device could still carry out a data transmission task without experiencing an unacceptable delay. When the collected network traffic information is lower than the predetermined threshold, operation 504 may be followed by operation 506. Otherwise, when the collected network information fails to be lower than the predetermined threshold, operation 504 may be followed by operation 508.

In operation 506, the first wireless communication device may be arranged to continue to perform a data transmission task. Operation 506 may be followed by operation 510.

In operation 508, the first wireless communication device may be adapted to suspend the data transmission task. Operation 508 may be followed by operation 510.

In operation 510, the first wireless communication device may also be configured to transmit the relevant operating mode information of its one or more components to a second wireless communication device in the same wireless communication system.

To further illustrate the example operations of FIG. 5, suppose a first transceiver module of the first wireless communication device is initially configured to operate in a transmitting mode and transmit data to the second wireless communication device. When the collected network traffic remains below the predetermined threshold, the first transceiver module may continue to carry out the data transmission task, because delay due to network congestion may be within an acceptable range. The first wireless communication device may also be adapted to transmit the operating mode of the first transceiver module to the second wireless communication device. In response, a second transceiver module of the second wireless communication device may be configured to continue operating in a receiving mode to receive data from the first wireless communication device.

On the other hand, when the collected network traffic is above the predetermined threshold, the first transceiver module may experience unacceptable delay to transmit data. The data transmission task may thus be suspended, and the first transceiver module may adapt to operate in a different mode (e.g., a sleeping mode) that may consume less energy than operating in the transmitting mode. The first wireless communication device may also be arranged to transmit this newly modified operating mode to the second wireless communication device. In response, the second transceiver module may adapt to also operate in the sleeping mode to conserve energy, since no data may be expected from the first wireless communication device. As a result, when the network traffic condition may not be suitable for data transmission, the amount of time the first wireless communication device and the second wireless communication device spend in energy intensive operating modes, such as the transmitting mode and the receiving mode, may be reduced. The energy consumption level for the overall wireless communication system may also be reduced.

Figure 6:
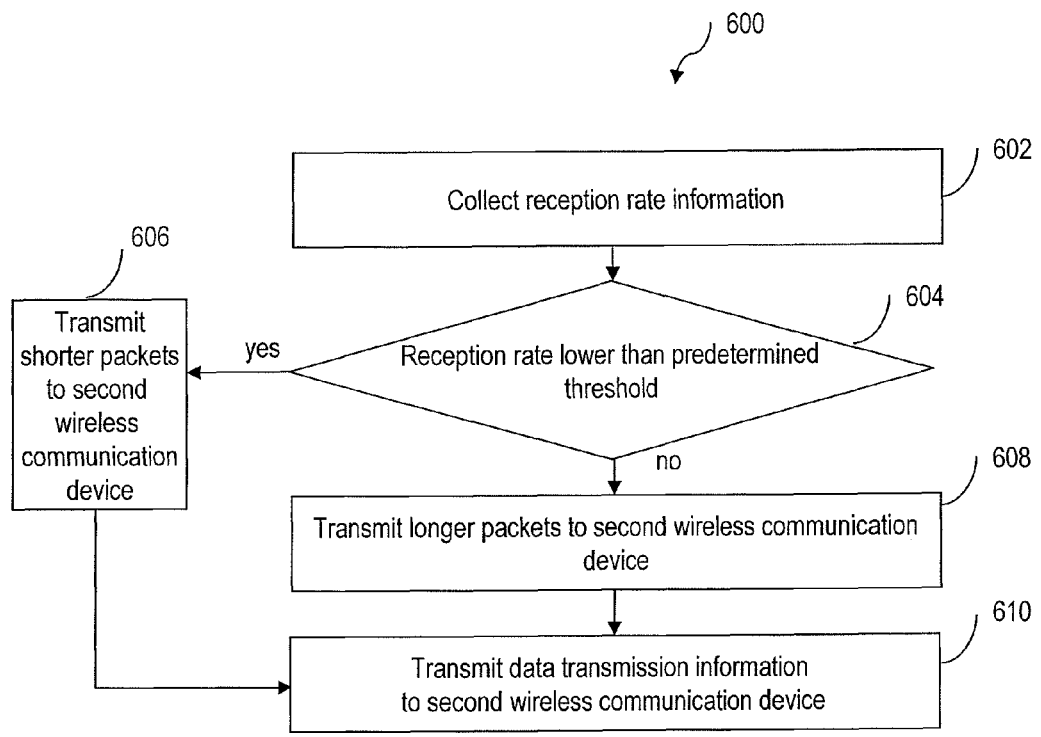
FIG. 6 is a flow chart showing example operations performed by a first wireless communication device in a wireless communication system in response to reception rate information.

FIG. 6 is a flow chart showing an example process 600 that may be performed by a first wireless communication device in a wireless system in response to reception rate information, arranged in accordance with at least some embodiments of the present disclosure. The example process 600 may include one or more of operations 602-610. An example first wireless communication device may be the first wireless communication device 102 of FIG. 1.

In operation 602, the first wireless communication device may be arranged to collect reception rate information for a communication link (e.g., the channel 112 in FIG. 1). Operation 602 may be followed by operation 604.

In operation 604, the first wireless communication device may be adapted to determine whether the reception rate is lower than a predetermined threshold. When the reception rate is determined to be lower than the predetermined threshold, operation 604 may be followed by operation 606. Otherwise, when the reception rate fails to be lower than the predetermined threshold, operation 604 may be followed by operation 608.

In operation 606, the first wireless communication device may be adapted to transmit shorter packets to a second wireless communication device in the same wireless communication system. Operation 606 may be followed by operation 610.

In operation 608, the first wireless communication device may be adapted to transmit longer packets to the second wireless communication device. Operation 608 may be followed by operation 610.

In operation 610, the first wireless communication device may also be configured to transmit relevant data transmission information of its one or more components to the second wireless communication device.

In some implementations, when the reception rate of the communication link is high, data may be received at a high reception rate. For example, for ultra low energy networks, high reception rate may be approximately 70%. For very low energy networks, high reception rate may be approximately 80%. For low energy networks, high reception rate may be approximately 90%. For the other wireless networks, high reception rate may be approximately 99% or even higher. However, receiving data at a high reception rate may be an energy intensive task. To further illustrate the example operations of FIG. 6, suppose the first wireless communication device is initially configured to transmit data at least in a first packet size to the second wireless communication device. When the first reception rate remains below the predetermined threshold, the first wireless communication device may be arranged to continue to transmit shorter packets. Some example packet sizes may include 25, 50, 100, and 200 bytes. The first wireless communication device may also be adapted to transmit relevant data transmission configuration information (e.g., the packet size) to the second wireless communication device. In response to the configuration information, the second wireless communication device may be configured to receive the shorter packets from the first wireless communication device.

On the other hand, when the reception rate is above the predetermined threshold, the first transceiver module may be configured to take advantage of the high reception rate by transmitting longer packets to the second wireless communication device. With longer packets, more data may be received by the second wireless communication device in a shorter period of time. The first wireless communication device may transmit configuration information (e.g., a long packet size) to the second wireless communication device. In response, the second wireless communication device may be reconfigured to receive the longer packets from the first wireless communication device. By varying packet sizes under different reception rate conditions, less time may be spent in energy intensive modes to carry out the data transmission, resulting in a reduction in the energy consumption level for the wireless communication system.

In addition to resizing packets, various example approaches could be performed to reduce the amount of time spent in energy intensive modes. One approach may be to compress messages. For example, irrespective of the reception rate, the first wireless communication device may compress messages before switching to the transmitting mode and sending out the compressed data to the second wireless communication device. Some example compression methods may include lossy techniques, such as the Moving Picture Experts Group (MPEG) compression method, and lossless techniques, such as Huffman, Arithmetic, Lempel-Ziv (LZ), and Lempel-Ziv-Welch (LZW). Not only may transmitting and receiving compressed data take less transmission time, the second wireless communication device may also remain in a low energy consumption operating mode before receiving the transmitting mode information from the first wireless communication device. In some implementations, the selection of the compression method and the timing of switching to the transmitting mode are determined based on the minimization of the weighted sum of the energy required for the selected compression method and also the energy required for operating in the transmitting mode.

Another approach may be to vary the lengths and/or types of error correction codes, so that the use of longer and/or inappropriate types of codes may be limited. For example, when the communication link between the first wireless communication device and the second wireless communication device is above a threshold for the quality of communication, shorter codes may be used to reduce the amount of data to be sent, received, and processed, resulting in less time spent in energy intensive modes. The quality of communication may be evaluated based on compression rate or error rate of the communication link.

Yet another approach may be to minimize data transmission when interferences from other wireless communication devices exceed a threshold level. For example, when the first wireless communication device is in a physical location with many other wireless communication devices potentially interfering with its data transmission, the first wireless communication device may configure itself to operate in an energy saving mode. For example, the first wireless communication device may configure itself to use fewer channels or lower transmission energy.

It should be noted the first wireless communication device may be configured to select parameters suitable for the signal transmissions in one or more channels in the MIMO system in a holistic way. For example, in some implementations, the parameters relating to reception rate may be set in one channel to satisfy the predetermined threshold while minimizing possible negative impacts on the other still unassigned channels. In other implementations, the parameters relating to quality of communication links may be set in such a way that an objective function characterizing the difference of the quality associated with one channel and the reduced expected quality in the still unassigned channels is maximized.

Figure 7:
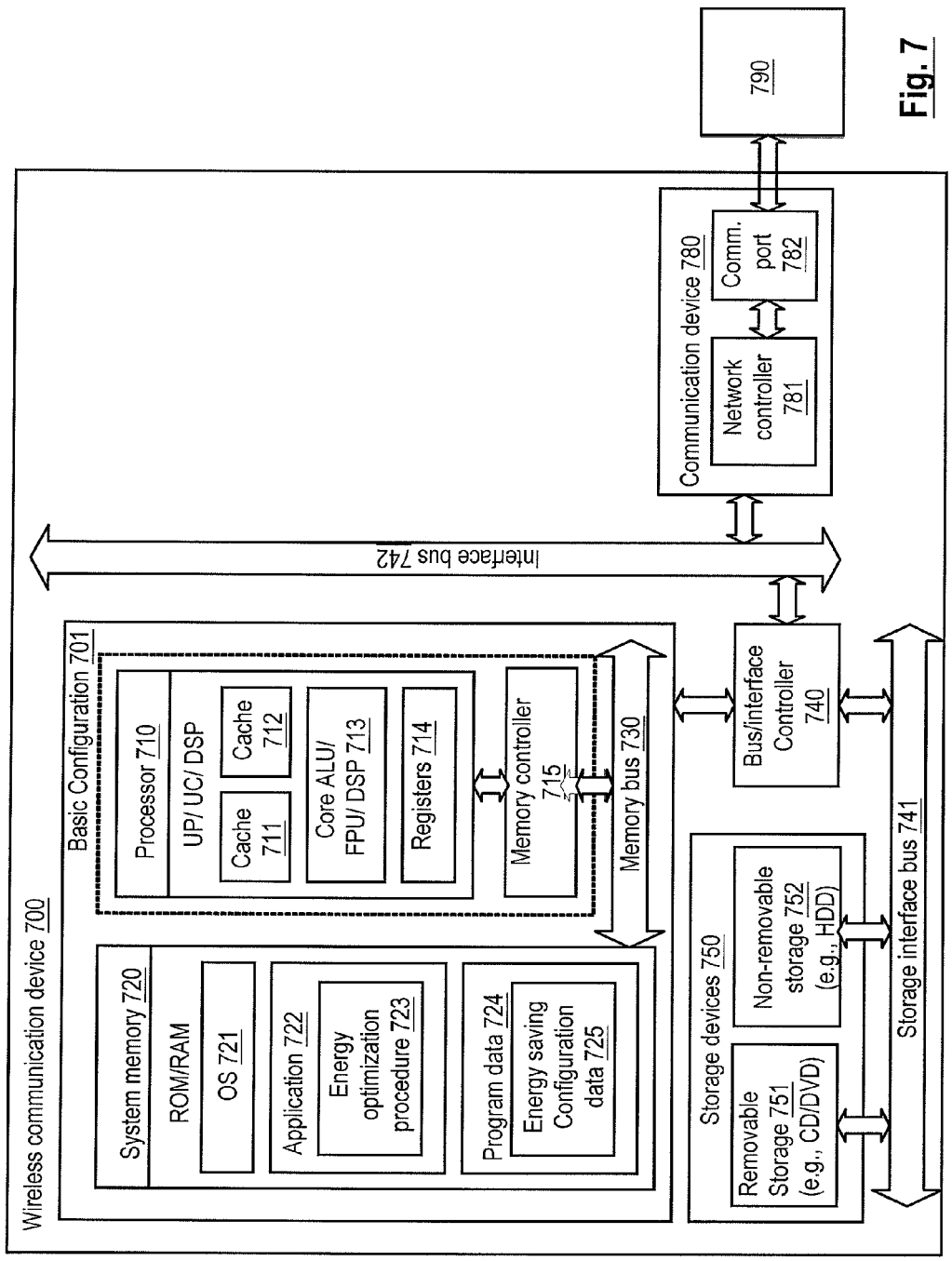
FIG. 7 is a block diagram illustrating an example wireless communication device.

FIG. 7 is a block diagram illustrating an example wireless communication device 700, arranged in accordance with at least some embodiments of the present disclosure. In a very basic configuration 701, the wireless communication device 700 typically includes one or more processors 710 and system memory 720. A memory bus 730 may be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 may include one more levels of caching, such as a level one cache 711 and a level two cache 712, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system (OS)

721, one or more applications 722, and program data 724. Application 722 may include an energy consumption optimization procedure 723 that is arranged to optimize the energy consumption of the wireless communication device 700. Program data 724 includes energy saving configuration data 725 having one or more energy consumption parameters. In some embodiments, application 722 may be arranged to operate with program data 724 on OS 721 such that computing device 700 may be adapted to perform one or more of the operations, processes, algorithms, and/or methods described herein.

Wireless communication device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage 750 and non-removable storage devices 751 include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by wireless communication device 700. Any such computer storage media may be part of wireless communication device 700.

Wireless communication device 700 may also include an interface bus 742 for facilitating communication from various interface devices (e.g., communication interfaces) to the basic configuration 701 via the bus/interface controller 740. An example communication device 780 includes a network controller 781, which may be arranged to facilitate communications with one or more other wireless communication devices 790 over a network communication link via one or more communication ports 782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Wireless communication device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions.

FIG. 8 is a schematic diagram showing an example computer program product 800 in accordance with at least some embodiments of the present disclosure. Computer program product 800 includes one or more sets of instructions 802 for executing an energy consumption optimization method. For illustration, the instructions 802 reflect some of the methods described above and illustrated in FIG. 3. Computer program product 800 may be transmitted in a signal bearing medium 804 or another similar communication medium 806. Computer program product 800 may be recorded in a computer readable medium 808 or another similar recordable medium 812.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to optimize energy consumption of a multiple-input multiple-output (MIMO) system that includes a first wireless communication device and a second wireless communication device, the method comprising:

collecting a set of information associated with one or more of an energy consumption, a network traffic condition, an environmental condition, and/or quality of a communication link associated with the first wireless communication device and/or the MIMO system and tracked by one or more modules of the MIMO system, wherein collecting the set of information comprises one or more of gathering information associated with the energy consumption by a first of the one or more modules configured to obtain static information, gathering information associated with the network traffic condition and/or the quality of communication link by a second of the one or more modules configured to obtain dynamic information, and gathering information associated with the environmental condition by a third of the one or more modules configured to obtain environmental information associated with the first wireless communication device and/or the MIMO system;

determining whether to cause a device-level change or a system-level change to the MIMO system based on an energy saving approach developed from the collected set of information;

configuring the first wireless communication device to change from operating at a first energy intensive level to a first reduced energy consumption level based on the collected set of information;

if the system-level change to the MIMO system is to occur, identifying operation information associated with the first wireless communication device based upon at least the configuration of the first wireless communication device; and transmitting the operation information for reception by the second wireless communication device so that the second wireless communication device can be configured to change from operating at a second energy intensive level to a second reduced energy consumption level based on the operation information.

2. The method of claim 1, wherein configuring the first wireless communication device comprises modifying the operation information associated with the first wireless communication device by changing an operating mode for a component of the first wireless communication device to reduce energy consumption before transmitting the operation information.

3. The method of claim 1, wherein configuring the first wireless communication device comprises:

comparing a surrounding temperature condition collected by the third of the one or more modules based on a set of criteria including an ambient temperature to generate a comparison result; and modifying the operation information associated with the first wireless communication device by changing an operating mode for a component of the first wireless communication device to reduce energy consumption based on the comparison result.

4. The method of claim 1, wherein configuring the first wireless communication device further comprises reducing amount of time the first wireless communication device spends in performing energy intensive tasks.

5. The method of claim 1, wherein configuring the first wireless communication device further comprises:

comparing the network traffic condition collected by the second of the one or more modules based on a set of criteria including network congestion to generate a comparison result; and modifying the operation information associated with the first wireless communication device by suspending a data transmission task to reduce energy consumption based on the comparison result.

6. The method of claim 1, wherein configuring the first wireless communication device further comprises:

comparing a reception rate condition collected by the second of the one or more modules based on a set of criteria including a reception rate to generate a comparison result; and modifying the operation information associated with the first wireless communication device by varying a size of a packet used to transmit data to the second wireless communication device to reduce energy consumption based on the comparison result.

7. The method of claim 1, wherein configuring the first wireless communication device further comprises:

comparing an interference condition collected by the second of the one or more modules based on a set of criteria including interference to generate a comparison result; and modifying the operation information associated with the first wireless communication device by suspending a data transmission task to reduce energy consumption based on the comparison result.

8. The method of claim 1, wherein configuring the first wireless communication device further comprises modifying the operation information by compressing data before transmitting compressed data for reception by the second wireless communication device.

9. The method of claim 1, wherein configuring the first wireless communication device further comprises modifying the operation information by varying the lengths of error correction codes used to transmit data for reception by the second wireless.

10. A multiple-input multiple-output (MIMO) system, comprising:

a first wireless communication device having an energy consumption optimization module;

one or more modules configured to collect a set of information associated with one or more of an energy consumption, a network traffic condition, an environmental condition, and/or quality of a communication link associated with the first wireless communication device and/or the MIMO system, wherein a first of the one or more modules configured to obtain static information gathers information associated with the energy consumption, a second of the one or more modules configured to obtain dynamic information gathers information associated with the network traffic condition and/or the quality of communication link, and a third of the one or more modules configured to obtain environmental information associated with the first wireless communication device and/or the MIMO system gathers information associated with the environmental condition; and a second wireless communication device coupled to the first wireless communication device via a wireless communication channel, wherein the energy consumption optimization module of the first wireless communication device is arranged to:

determine whether to cause a device-level change or a system-level change to the MIMO system based on an energy saving approach developed from the set of collected information;

configure the first wireless communication device to change from operating in an operating mode associated with a first energy intensive level to operating in another operating mode associated with a first reduced energy consumption level, and if the system-level change to the MIMO system is to occur, identify operation information associated with the first wireless communication device based upon at least the configuration of the first wireless communication device; and encode the operation information in a transmission from the first wireless communication device to the second wireless communication device so that the second wireless communication device can be configured to change from operating at a second energy intensive level to a second reduced energy consumption level based on the operation information.

11. The MIMO system of claim 10, wherein
the energy consumption optimization module of the first wireless communication device is further configured to modify the operation information associated with the first wireless communication device by changing a first operating mode for a first component of the first wireless communication device to reduce energy consumption, and
in response to receiving the first operating mode as the operation information associated with the first wireless communication device, the second wireless communication device is further configured to change a second operating mode for a second component of the second wireless communication device to reduce energy consumption.

12. The MIMO system of claim 10, wherein the energy consumption optimization module is further configured to modify the operation information associated with the first wireless communication device based on a temperature condition collected by the third of the one or more modules.

13. The MIMO system of claim 10, wherein
the energy consumption optimization module is further configured to modify the operation information associated with the first wireless communication device by suspending a data transmission task for the first wireless communication device based on the network traffic condition collected by the second of the one or more modules, and
the second wireless communication device is configured to remain operating in the second reduced energy consumption level until receipt of a notification from the first wireless communication device to resume the data transmission task.

14. The MIMO system of claim 10, wherein the energy consumption optimization module is further configured to
modify the operation information associated with the first wireless communication device by varying a size of a packet used to transmit data to the second wireless communication device based on a reception rate condition collected by the second of the one or more modules.

15. The MIMO system of claim 10, wherein
the energy consumption optimization module is further configured to modify the operation information associated with the first wireless communication device by suspending a data transmission task for the first wireless communication device based on an interference condition collected by the second of the one or more modules, and
the second wireless communication device is configured to remain operating in the second reduced energy consumption level until receipt of a notification from the first wireless communication device to resume the data transmission task.

16. The MIMO system of claim 10, wherein the energy consumption optimization module is further configured to modify the operation information associated with the first wireless communication device by compressing data before the first wireless communication device transmits compressed data to the second wireless communication device while minimizing a weighted sum of a first energy required for compressing data and a second energy required for operating in a transmission mode.

17. The MIMO system of claim 10, wherein the energy consumption optimization module is further configured to modify the operation information associated with the first wireless communication device by varying lengths and/or types of error correction codes used for the first wireless communication device to transmit data to the second wireless communication device.

18. A non-transitory computer readable medium that contains a sequence of instructions to optimize energy consumption for a multiple-input multiple-output (MIMO) system having a first wireless communication device and a second wireless communication device, wherein the sequence of instructions, when executed by the first wireless communication device, causes the first wireless communication device to:
collect a set of information associated with one or more of an energy consumption, a network traffic condition, an environmental condition, and/or quality of a communication link associated with the first wireless communication device and/or the MIMO system and tracked by one or more modules of the MIMO system, wherein
information associated with the energy consumption is gathered by a first of the one or more modules configured to obtain static information,
information associated with the network traffic condition and/or the quality of communication link is gathered by a second of the one or more modules configured to obtain dynamic information, and
information associated with the environmental condition is gathered by a third of the one or more modules configured to obtain environmental information associated with the first wireless communication device and/or the MIMO system;
determine whether to cause a device-level change or a system-level change to the MIMO system based on an energy saving approach developed from the collected set of information;
configure the first wireless communication device to change from operating at a first energy intensive level to a first reduced energy consumption level based on the collected set of information;
if the system-level change to the MIMO system is to occur, identify operation information associated with the first wireless communication device based upon at least the configuration of the first wireless communication device; and
transmit the operation information for reception by the second wireless communication so that the second wireless communication device can be configured to change from operating at a second energy intensive level to a second reduced energy consumption level based on the operation information.

* * * * *